(12) United States Patent
Nakayama

(10) Patent No.: US 7,283,326 B2
(45) Date of Patent: Oct. 16, 2007

(54) METHODS FOR PRODUCING A PROTECTIVE FILM ON RECORDING MEDIA

(75) Inventor: Masatoshi Nakayama, Tokyo (JP)

(73) Assignee: TDK Corporation, Tokyo (JP)

( * ) Notice: Subject to any disclaimer, the term of this patent is extended or adjusted under 35 U.S.C. 154(b) by 490 days.

(21) Appl. No.: 10/867,742

(22) Filed: Jun. 16, 2004

(65) Prior Publication Data

US 2005/0280933 A1 Dec. 22, 2005

(51) Int. Cl.
G11B 5/40 (2006.01)
G11B 5/39 (2006.01)
(52) U.S. Cl. .................................. 360/122; 428/814
(58) Field of Classification Search ............. 360/122, 360/235.2, 235.8, 236.6; 428/814
See application file for complete search history.

(56) References Cited

U.S. PATENT DOCUMENTS 6,028,618 A * 2/2000 Defieuw et al. ............ 347/202
6,172,850 B1 * 1/2001 Ishihara .................... 360/235.2
6,590,741 B1 * 7/2003 Hasegawa et al. .......... 360/122
6,947,259 B2 * 9/2005 Miyazaki et al. ......... 360/234.7
2005/0280934 A1 * 12/2005 Nakayama .................. 360/122

FOREIGN PATENT DOCUMENTS

| JP | 4-276367 | 10/1992 |
| JP | 2571957 | 10/1996 |
| JP | 10-275308 | 10/1998 |
| JP | 10-275308 A | 10/1998 |

* cited by examiner

Primary Examiner—Jefferson Evans
(74) Attorney, Agent, or Firm—Oblon, Spivak, McClelland, Maier & Neustadt, P.C.

(57) ABSTRACT

A method of producing a protective film on recording media including forming a protective film on at least the surface facing a recording medium, said protective film having the composition represented by the formula: $SiC_XH_YO_ZN_W$, where $X=3$-$26$, $Y=0.5$-$13$, $Z=0.5$-$6$ and $W=0$-$6$, in terms of atomic ratio, having a film thickness of 1-3 nm and having a refractive index of 2.0 or more.

13 Claims, 1 Drawing Sheet

METHODS FOR PRODUCING A PROTECTIVE FILM ON RECORDING MEDIA

APPLICATION FIELD IN INDUSTRY

The present invention relates to various thin-film magnetic heads, such as MR (Magnetoresistive) head, GMR (Giant Magnetoresistive) head, TMR (Tunneling Junction Magnetoresistive) type head and CPP (Current Perpendicular to plane) type head, and the method for producing the same.

BACKGROUND ART

Recently, in the field of magnetic recording, demand for higher density has been increased and development has been made to meet such demand. With the increase of the density, several types of heads for hard disks have been studied and developed, such as a thin-film magnetic head in which a soft magnetic thin film is used as magnetic poles.

There are different types of thin-film magnetic heads, including MR head, GMR head, and TMR type or CPP type head.

Typically, the thin-film head adopts the CSS (Contact Start Stop) type in which the thin-film head is floated above the recording medium by bearing effect of air. The head is generally held at a distance (about 1-10 nm) slightly above the magnetic disc rotating at a high speed. Therefore, surface strength and abrasion resistance, that provide tolerance to head crash and CSS abrasion, are important. Various studies have been made to improve the abrasion resistance, as disclosed, for example, in Japanese Patent Application Kokai No. 4-276,367, in which a protective film is formed on a rail of a magnetic head slider. This protective film consists of a silicon layer having a thickness of 250 Å (25 nm) or less, exhibiting low strength. In addition, when such a silicon layer is applied to the magnetic thin-film head structure containing a sintered substrate made of alumina and titanium carbide, an alumina insulation layer, a thin film made of a soft magnetic material (e.g. permalloy, SendLust, iron nitride and the like) and the like, cohesion or adhesiveness between the thin-film head and the protective film becomes poor, leading to problems such as peeling of the film and insufficient abrasion resistance.

For protective layer to improve the abrasion resistance, thin-film made of TiN or TiCN, diamond-like carbonaceous film (DLC) and the like have been known. However, use of these films on the thin-film magnetic head cannot attain sufficient durability.

Japanese Patent No. 2,571,957 discloses that a buffer layer consisting of amorphous silicon and amorphous silicon carbide is formed oil the surface or an oxide, and then a film of carbon or a film mainly composed of carbon is further formed thereon. However, even though the protective layer with the buffer layer is applied to the thin-film head, sufficient durability cannot be attained. In addition, it has disadvantages in that the extra step is required to form the buffer layer, in addition to the step to form the protective film, leading to a longer production period and a higher production cost. Moreover, the buffer layer makes the film thicker, which contradicts the demands on the magnetic head for hard disk, such as cost-effectiveness, mass-productivity, and larger packing density.

Under these circumstances, the present applicant has proposed an Si—C protective film formed by vapor deposition from predetermined compositions (see Japanese Patent Application Kokai Nos. 10-289419 and 10-275308).

The storage capacity of hard disc depends on the performance of the head, and the future market will demand the capacity of 120 GB or more. Therefore, the thickness of the protective film covering the head is demanded to be 3 nm (30 Å) or less.

On the other hand, the above-disclosed protective film realizes a thickness of approximately 7 nm (70 Å), due to the limitation in the technical level at that time, and thus sufficient durability cannot be obtained if the film is used as it is. Especially, corrosion resistance against water is important, since the problem of water condensation may occur in the device.

SUMMARY OF THE INVENTION

The object of the present invention is to provide a thin-film head which comprises a thin film exhibiting strong coherence to the components of the head and excellent durability, and the method for producing the same.

Another object is to provide a method for producing the thin-film head in which a thinner film can be obtained with less production steps and lower costs.

The above-mentioned objects can be attained by any one of the following (1)-(10):

(1) A thin-film head wherein a protective film is formed at least on the surface facing a recording medium, said protective film having a composition represented by the formula $$SiC_XH_YO_ZN_W, \quad (I)$$

where X=3-26, Y=0.5-13, Z=0.5-6 and W=0-6, in terms of atomic ratio, 1-3 nm, and a refractive index of 2.0 or more.

(2) The thin-film head according to (1) above, wherein end faces of an oxide substrate, an oxide insulation layer and a layer made of a soft magnetic metal are present on said surface facing the recording medium.

(3) The thin-film head according to (1) above, wherein said head is selected from an MR head, a GMR head, a TMR type and CPP type head.

(4) A method for producing a thin-film head including: vapor-depositing a protective film at least on a surface of the head facing a recording medium while applying a negative bias voltage to the thin-film head, said protective film having a composition represented by the formula $$SiC_XH_YO_ZN_W, \quad (I)$$

where X=3-26, Y=0.5-13, Z=0.5-6 and W=0-6, in terms of atomic ratio 1-3 nm; and a refractive index of 2.0 or more.

(5) The method according to (4) above, wherein said bias voltage is applied as self-bias generated by an applied DC voltage or an applied high frequency current.

(6) The method according to (4) above, wherein said protective film is formed by a plasma CVD method.

(7) The method according to (4) above, wherein said protective film is formed by an ionization deposition method.

(8) The method according to (4) above, wherein said protective film is formed by a sputtering method.

(9) The method according to (4) above, wherein said surface facing the recording medium comprises an oxide substrate, an oxide insulation layer, an interlayer thin film and a layer made of a soft magnetic metal.

(10) The method according to (4) above, wherein said head is selected from an MR head, a GMR head and a TMR type or CPP type head.

FUNCTION AND EFFECT

In the present invention, a protective layer comprising SiC+H+O (and optionally N) of predetermined composition ratios is formed at least on the surface facing the recording medium of the thin-film head, i.e., the surface floating above the medium or having a sliding contact with the medium. This protective film can be formed on the thin-film magnetic head by a plasma CVD method, an ionization deposition method, an sputtering method and the like while a DC bias voltage or self-bias is being applied.

The resulting protective film has a thickness of 1-3 nm and a refractive index of 2.0 or more. Even with this thin structure, the protective film has excellent durability and abrasion resistance, as compared with the thin-films made of TiN or TiCN. In addition, when compared with the diamond-like thin film (DLC) optionally with a buffer layer, the above-obtained film has a higher coherence to the components of the thin-film head, such as alumina, permalloy and Sendust, resulting in improvement of durability, which in turn renders the thin-film head a longer life. Moreover, the total thickness of the protective film can be reduced, since there is no need for any intermediate layer or buffer layer, and thus cost performance and production efficiency are improved. Since the thickness of the protective film can be reduced to 1-3 nm, packing density can be improved.

The present invention satisfies the requirements for the protective film of the head for hard disc of 120 GB or more that the thickness be 3 nm or less. At the same time, the film has a refractive index of 2.0 or more, which gives sufficient durability and especially corrosion resistance against water.

It is preferred that such a protective film be formed by, for example, the plasma CVD method, and the film can be formed under a low film-forming pressure by reducing the amount of gas under a high bias voltage. In this case, it is preferred that the film-forming pressure is 0.001-0.008 Torr.

BEST MODE FOR CARRYING OUT THE INVENTION

Figure 1:
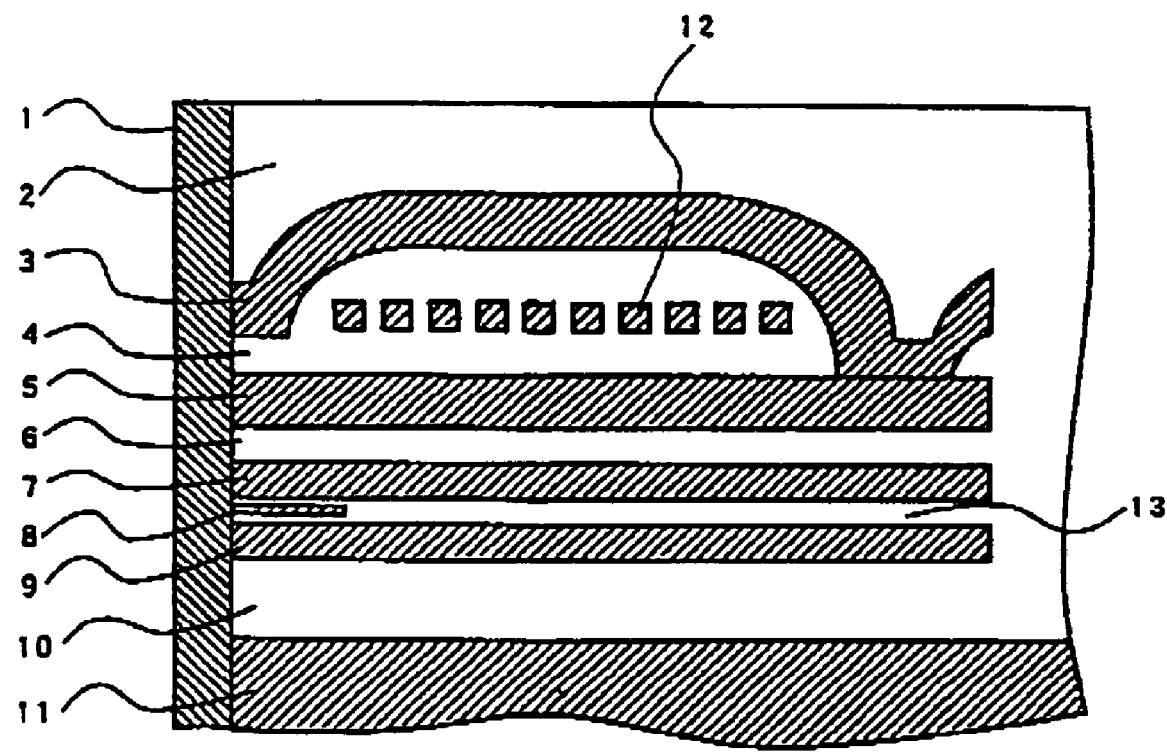
FIG. 1 shows a schematic cross section of one embodiment of the thin-film head (MR thin-film head) of the present invention.

The specific embodiment of the thin-film head of the present invention will be explained in detail below.

The thin-film head of the present invention comprises a protective film formed on at least the surface facing the recording medium. The composition of the protective film is represented by the following formula (I):

where X, Y, Z and W show atomic ratios, and X=3-26, Y=0.5-13, Z=0.5-6 and W=0-6, preferably X=1-8, Y=1-4, Z=0.5-4, especially 0.5-2 and W=0-4, especially 0-2. Among the conditions above, Z+W=0.5-4, especially 0.5-3 is preferred.

When X is below 3, the film has a low hardness. On the other hand, when X is above 26, the internal stress becomes large, and the coherence becomes low. When Y is below 0.5, the film has a low hardness. On the other hand, when Y is above 13, the film also shows a low hardness. When Z is below 0.5, the film has a low strength and is susceptible to damage. When each of Z and W is above 6, the film density and the abrasion resistance become low.

Optionally, in addition to the above-mentioned main components, at least one element selected from S, B, P and the like may be contained in an amount of 3 wt % or less, relative to the total amount. The protective film satisfying such conditions is in amorphous sate, and the thickness is 1-3 nm. The refractive index at the wavelength of 632 nm is 2.0 or more.

By realizing such film thickness and refractive index, the demand for higher density can be satisfied and a sufficient durability and other properties can be provided as well. On the other hand, when the thickness is below 1 nm, durability and other properties become poor, and when the thickness is above 3 nm, the spacing from the recording medium becomes large, which does not meet the demand for higher density. In addition, when the refractive index is below 2.0, the durability and the other properties become poor.

With respect to the refractive index, there is no upper limitation, but in general, it is approximately 2.8. In general, the Vickers hardness of the protective layer is approximately 600-400.

Next, the thin-film head of the present invention will be explained below.

FIG. 1 shows a schematic cross section of one embodiment of the thin-film head of the present invention. The thin-film head shown in the drawing has a protective film 1 according to the present invention, a protective layer 2, an upper magnetic pole layer 3, a gap 4, a lower magnetic pole layer 5, an insulation layer 6, an upper shield layer 7, an MR element 8, a lower shield layer 9, a base layer 10, a substrate 11, a conductive coil 12, and an insulation layer 13.

The thin-film head illustrated in the figure is a so-called MR induction type composite head, having both an MR head portion for reproducing and an induction type head portion for recording. The induction type head portion for recording is composed of the upper magnetic pole layer 3, the lower magnetic pole layer 5, the gap 4 and the conductive coil 12 sandwiched therebetween. The MR head portion is composed of the upper shield layer 7, the lower shield layer 9, the insulation layer 13 and the MR element 8 sandwiched therebetween. In the Figure, the induction type head portion is located on the trailing side, and the MR head portion on the leading side.

In general, a nonmagnetic material (e.g. alumina) is used for the protective layer 2, a soft magnetic material (e.g. permalloy and the like) for the upper and the lower magnetic pole layers 3 and 5, a soft magnetic material (e.g. permalloy, Sendust, iron nitride and the like) for the upper and the lower shield layers 7 and 9, and a nonmagnetic material (e.g. alumina) for the base layer 10.

For the MR element, various materials having magnetoresistance can be used, besides permalloy or Ni—Co alloy. Some of them can lower the temperature of heat treatment, and thus are especially preferred when the MR element film comprises multiple layers. Examples of the MR film comprising multiple layers include a spin-valve type artificial lattice multiple-layered film (e.g. NiFe/Cu/NiFe/FeMn and Co/Cu/Co/FeMn) and antiferromagnetic artificial lattice multiple-layered film (e.g. NiFe/Ag and Co/Ag).

For the lead connected to the MR element, materials that do not diffuse into the MR film, such as Ta, W and the like, are preferably used. For the insulation layers 6 and 13, general insulation materials can be used, such as various ceramics including $Al_2O_3$ and $SiO_2$. The substrate 11 formed from attic (calcined substrate made of alumina and titanium carbide) is usually fixed to the slider of the magnetic head, and alternatively, the substrate 11 itself can be used as a slider.

The thin-film head unit is formed by laminating these structures, and the protective film 1 of the present invention is formed at least on the surface of the unit which runs along or slides in contact with the magnetic recording medium (magnetic disk), In other words, on the surface facing the recording medium (in the figure, on the left side of the drawing and on the plane perpendicular to the plane of the paper). It should be noted that there is no limitation with respect to the part on which the protective film 1 is formed, as long as the film is formed at least on the surface of the thin-film head unit which runs along the medium or slides in contact with the medium, while it is not necessary to form the protective film on the other portions of the thin-film head. However, the protective film may be formed on or attached to the other parts depending on the conditions in the forming method of the protective film or the forming method of the thin-film head, or the protective film may be formed on the other parts for the purpose of, for example, improving the strength of the entire thin-film head.

There is also no limitation with respect to the size of the various parts, and they should be appropriately selected depending on the structure of the magnetic recording media to be used together. In general, the shield layers 7 and 9 have a thickness of 1-5 μm and a width of 30-200 μm; the MR element (magnetoresistive film) 8 has a thickness of 5-60 nm and a width of 1-10 μm; the distance between the shield layers 7 and 9 and the MR element 8 is 0.03-1.0 μm; the magnetic pole layers 3 and 5 of the induction type head portion has a thickness of 1-5 μm and a width of 0.5-10 μm; the shield layer 7 on the trailing side and the lower magnetic pole layer 5 of the induction type head portion is 1-10 nm.

In the magnetic head of the present invention, there is no limitation with respect to the method of linearization of the MR element, and any appropriate method can be selected, such as current bias method, hard film bias method, soft film bias method and shape bias method.

In general, the magnetic head of the present invention is formed by thin-film production and pattern formation. For the formation of the films, vapor deposition method, such as sputtering method and vacuum evaporation method, and plating method or the like may be used. Pattern formation can be conducted by selective etching or selective deposition.

The thin-film head of the present invention can be applied to not only the above-mentioned embodiment shown in the Figure, but also thin-film heads having different structures. Examples include a head in which the lower magnetic pole and the upper shield are integrated; a head without MR element thus solely induction type head (hereinafter, the head with MR element is sometimes referred to as "MR thin-film head", and the simple induction type head as "induction thin-film head"). The preferable effect of the present invention can be attained especially when the thin-film head uses a composite material comprising at least one member selected from a calcined substrate made of alumina and titanium carbide, alumina, permalloy, Sendust and iron nitride.

It is preferred that the thin-film head of the present invention be especially MR head, GMR head, and TMR or CPP type head.

The magnetic head of the present invention is used in combination with the known assembly, such as arms.

Next, the method for producing the thin-film head will be explained below.

In the present invention, it is especially preferred that the protective film be formed by plasma CVD method. With respect to the plasma CVD method, reference can be made to, for example, Japanese Patent Application Kokai No. 4-41672. The plasma to be used in the plasma CVD method may be either direct current or alternating current, but alternating current is preferred. Alternating current can range from a few hertz to microwave. In addition, ECR plasma described in, for example, "Diamond thin-film technique" (published by Technology Center) can be used.

In the present invention, bias-applied plasma CVD method is preferably used as the plasma CVD method. In the bias-applied plasma CVD method, a negative bias voltage is applied to the thin-film head. Detailed description is found in, for example, M. Nakayama et al. Journal of the Ceramic Society of Japan Int. Edition Vol. 98, pp 607-609 (1990). Alternatively, self-bias can be utilized, instead of applying a bias voltage. When a plasma power source, which is an alternating-current power supply, is connected to the electrode of the device, plasma is generated. This plasma contains electrons, ions and radicals, and is neutral as a whole. However, when the frequency of the plasma power source is audio frequency (AF), radiofrequency (RF) or microwave (MW), the difference in mobility is generated between ions and electrons, and as a result, negative voltage state is generated on the side of the applied electrode (typically the side that is not grounded). This voltage is called a self-bias voltage. The above-mentioned bias voltage is preferably −10~−2000 V, and more preferably −50~−1000 V.

When the protective film is formed using the plasma CVD method, the material gas is preferably selected from the following group of compounds. Examples of the single compounds for obtaining the composition of Si+C+H+O include tetramethoxysilane, tetraethoxysilane, octamethylcyclotetrasiloxane, hexamethylcyclosiloxane, hexamethoxydisiloxane, hexaethoxydisiloxane, triethoxyvinylsilane, dimethylethoxyvinylsilane, trimethoxyvinylsilane, methyltrimethoxysilane, dimethoxymethylchlorosilane, dimethoxymethylsilane, trimethoxysilane, dimethylethoxysilane, trimethoxysilanol, hydroxymethyltrimethylsilane, methoxytrimethylsilane, dimethoxydimethylsilane and ethoxytrimethoxysilane. These can be used in combination, or used together with other compounds.

To obtain the composition of Si+C+H+O+N, $N_2$ (as a N source), $NH_3$ or the like (as N+H sources), and compounds of N and O represented by $NO_x$, such as NO, $NO_2$, $N_2O$ (as N+O sources) can be used, in addition to the above-mentioned material gas. Other than those, compounds containing Si+C+H, Si+C+H+O or Si+C+H+N, can be used in combination with O sources, ON sources or N sources. For the O sources, $O_2$, $O_3$ and the like can be used, and as the C+H sources, hydrocarbons, such as $CH_4$, $C_2H_4$, $C_2H_6$, $C_3H_8$ and $C_6H_6$, can be used.

Examples of the compounds containing Si, C and H include methysilane, dimethylsilane, trimethylsilane, tetramethylsilane, diethylsilane, tetraethylsilane, tetrabutylsilane, dimethyldiethylsilane, tetraphenylsilane, methyltriphenylsilane, dimehtyldiphenylsilane, trimethylphenylsilane, trimethylsilyl-trimethylsilane and trimethylsilylmethyl-trimethylsilane. Examples of the compounds containing Si, C, H and N include 3-aminopropyldiethoxymethylsilane, 2-cyanoethyltriethoxysilane, 3-allylaminopropyltrimethoxysilane and 3-aminopropyltriethoxysilane. These can be used in combination, or used together with silane compounds and hydrocarbons.

The flow rate of the above-mentioned material gas can be selected depending on the types of the material gas. In general, it is preferred that the operating pressure be 0.001-0.008 Torr and the input power be 10 W-5 kW.

In the present invention, the ionization deposition method can be used for forming the protective film. With respect to the ionization deposition method, reference can be made to, for example, Japanese Patent Application Kokai Nos. 58-174507 and 59-174508. It should be noted that the methods and the devices are not limited to the disclosed ones, and other types of ionization deposition technique can be applied, if it is possible to accelerate the material ionization gas of the protective film.

In this case, as one example of the preferred device, rectilinear ion type or deflection ion type device described in Japanese Patent Application Kokai No. 59-174508 can be mentioned.

In the ionization deposition method, the inside of the vacuum container is kept under the high-vacuum of approximately $10^{-6}$ Torr. This vacuum container is equipped with a filament therein which generates thermoelectrons when heated by the alternating-current power supply. This filament is sandwiched by an electrode couple, and voltage Vd is applied to the filament. In addition, an electromagnetic coil which generates a magnetic field for capturing ionized gas is placed in such manner that it surrounds the filament and the electrode couple. The material gas collides with the thermoelectrons from the filament, and generates positive thermolytic ions and electrons. This positive ion is accelerated by negative potential Va applied to the grid. By adjusting Vd, Va and the magnetic field of the coil, the composition and the quality of the film can be altered. In the present invention, it is preferred that Vd=10~500 V and Va=-10~-500 V. In this case also, a negative bias voltage is used for applying bias to the thin-film head. The bias voltage is preferably direct current. Alternatively, self-bias can be utilized instead of applying bias voltage. As mentioned above, the bias voltage is preferably -10~-2000 V more preferably -50~-1000 V.

When the protective film is formed by the ionization deposition method, the same material gas as in the case of the plasma CVD method can be used. The flow rate of the material gas can be selected depending on the type of the gas. In general, the operating pressure is preferably 0.001-0.008 Torr.

It is also possible to form the protective film by the sputtering method. In this case, gases such as $O_2$, $N_2$, $NH_3$ and $H_2$ can be introduced as reactive gas, in addition to sputter gas, such as Ar and Kr. In addition, C, Si, $SiO_2$, $Si_3N_4$, SiC or the like may be used as a target, or mixed target containing C, Si, $SiO_2$, $Si_3N_4$ and SiC may be used as a target, or more than two targets selected from the group containing C, Si, N and O may be used. Polymer can be used as a target. With the use of such targets, a high frequency power is applied, thereby sputtering the target; and the sputter is accumulated on the thin-film head placed on the substrate, thereby forming a protective film. In this case also, a negative bias voltage is used for applying bias to the substrate or the thin-film head. The bias voltage is preferably direct current. Alternatively, self-bias can be utilized instead of applying bias voltage. The bias voltage mentioned above is preferably -10~-2000V, more preferably -50~-1000 V. The high frequency sputter power is generally 50 W-2 kW. In general, the operating pressure is preferably $10^{-5}$-$10^{-3}$ Torr.

EXAMPLES

The present invention will be explained in detail with reference to the specific Examples. In the following Examples, the film is formed on GMR head, by plasma CVD method.

Example 1

$Si(OCH_3)_4$ and $C_2H_4$ were introduced as material gases for compounds containing Si, C, H and O, at the flow rates of 5 SCCM and 10 SCCM, respectively. RF power of 500 W was applied as alternating current for generating plasma, and the operating pressure of 0.005 Torr and the self-bias of -800 V were applied on the running surface or sliding surface of the GMR thin-film head, thereby forming a film of 2 nm. This film is referred to as Sample 1.

Samples 2-4 were prepared in substantially the same manner as in the case of Sample 1, except that the thickness of the protective film is changed to those shown in Table 1.

Sample 5 was prepared in substantially the same manner as in the case of Sample 1, except that the operating pressure was changed to 0.05 Torr and the self-bias to -400 V The properties of the obtained samples were evaluated as explained below, and the results are shown in Table 1. The compositions of the obtained films determined by chemical analysis are also shown, as well as the refractive indexes measured with an ellipsometer.

(1) Scratch Hardness

Scratch hardness was evaluated by scratch test with a scratch test device type SRC-02 (manufactured by RHESCA), with the use of a diamond indenter of 100 µm. Relative values are shown in the Table.

(2) Breakdown Voltage

Breakdown voltage after conducting CSS test 50,000 times was measured and evaluated. Higher breakdown voltage means higher durability to CSS.

(3) Corrosion Resistance

The head was immersed in deoxidized water for 5 minutes, and the degree of corrosion was observed. Fifty samples were tested, and the ratio of the samples that can be used without any problem after immersion (the acceptable heads) to the total 50 samples is determined. In the Table, the results are shown with the signs ○, Δ and ×.

○ all acceptable
Δ 50% acceptable
× 10% or less acceptable

[Table 1]

TABLE 1

| Sample No. | Material gas | Operating pressure (Torr) | Bias voltage (V) | Composition | Refractive index | Film thickness (nm) | Thin-film head type | Scratch hardness (relative value) | Breakdown voltage (V) | Corrosion resistance |
|---|---|---|---|---|---|---|---|---|---|---|
| 1 | $Si(OCH_3)_4 + C_2H_4$ | 0.005 | −800 | $SiC_{15}H_4O_4$ | 2.2 | 2 | GMR | 60 | 40 | ○ |
| 2 | $Si(OCH_3)_4 + C_2H_4$ | 0.005 | −800 | $SiC_{15}H_4O_4$ | 2.2 | 3 | GMR | 70 | 50 | ○ |
| 3 | $Si(OCH_3)_4 + C_2H_4$ | 0.005 | −800 | $SiC_{15}H_4O_4$ | 2.2 | 1 | GMR | 50 | 35 | ○ |
| 4 (comparison) | $Si(OCH_3)_4 + C_2H_4$ | 0.005 | −800 | $SiC_{15}H_4O_4$ | 2.2 | 0.5 | GMR | 20 | 5 | X |
| 5 (comparison) | $Si(OCH_3)_4 + C_2H_4$ | 0.05 | −400 | $SiC_{15}H_4O_4$ | 1.6 | 2 | GMR | 30 | 20 | X |

Example 2

$Si(OCH_3)_4$ and $CH_4$ were introduced as material gases for compounds containing Si, C, H and O, at the flow rates of 5 SCCM and 6 SCCM, respectively RF of 500 W was applied as alternating current for generating plasma. Substantially the same procedures were repeated as in Example 1 to prepare the samples shown in Table 2, by selecting either 0.005 Torr or 0.05 Torr as the operating pressure and −800 V or −400 V as the self-bias applied on the running surface or sliding surface of the GMR thin-film head: The samples were evaluated and the results are shown in Table 2.

[Table 2]

TABLE 2

| Sample No. | Material gas | Operating pressure (Torr) | Bias voltage (V) | Composition | Refractive index | Film thickness (nm) | Thin-film head type | Scratch hardness (relative value) | Breakdown voltage (V) | Corrosion resistance |
|---|---|---|---|---|---|---|---|---|---|---|
| 21 | $Si(OCH_3)_4 + CH_4$ | 0.005 | −800 | $SiC_{10.5}H_{2.9}O_5$ | 2.2 | 2 | GMR | 60 | 40 | ○ |
| 22 | $Si(OCH_3)_4 + CH_4$ | 0.005 | −800 | $SiC_{10.5}H_{2.9}O_5$ | 2.2 | 3 | GMR | 70 | 50 | ○ |
| 23 | $Si(OCH_3)_4 + CH_4$ | 0.005 | −800 | $SiC_{10.5}H_{2.9}O_5$ | 2.2 | 1 | GMR | 50 | 35 | ○ |
| 24 (comparison) | $Si(OCH_3)_4 + CH_4$ | 0.005 | −800 | $SiC_{10.5}H_{2.9}O_5$ | 2.2 | 0.5 | GMR | 8 | 15 | X |
| 25 (comparison) | $Si(OCH_3)_4 + CH_4$ | 0.05 | −400 | $SiC_{10.5}H_{2.9}O_5$ | 1.6 | 2 | GMR | 30 | 20 | X |

Example 3

$SiH_4$, $CO_2$ and $CH_4$ were introduced as material gases for compounds containing Si, C, H and 0, at the flow rates of 20 SCCM, 10 SCCM and 50 SCCM, respectively. RF of 500 W was applied as alternating current for generating plasma. Substantially the same procedures were repeated as in Example 1 to prepare the samples shown in Table 3, by selecting either 0.005 Torr or 0.05 Torr as the operating pressure and −800 V or −400 V as the self-bias applied on the running surface or sliding surface of the GMR thin-film head. The samples were evaluated and the results are shown in Table 3.

[Table 3]

TABLE 3

| Sample No. | Material gas | Operating pressure (Torr) | Bias voltage (V) | Composition | Refractive index | Film thickness (nm) | Thin-film head type | Sctatch hardness (relative value) | Breakdown voltage (V) | Corrosion resistance |
|---|---|---|---|---|---|---|---|---|---|---|
| 31 | $SiH_4 + CO_2 + CH_4$ | 0.005 | −800 | $SiC_{10.5}H_{2.9}O_5$ | 2.2 | 2 | GMR | 62 | 41 | ◯ |
| 32 | $SiH_4 + CO_2 + CH_4$ | 0.005 | −800 | $SiC_{10.5}H_{2.9}O_5$ | 2.2 | 3 | GMR | 73 | 51 | ◯ |
| 33 | $SiH_4 + CO_2 + CH_4$ | 0.005 | −800 | $SiC_{10.5}H_{2.9}O_5$ | 2.2 | 1 | GMR | 51 | 33 | ◯ |
| 34 (comparison) | $SiH_4 + CO_2 + CH_4$ | 0.005 | −800 | $SiC_{10.5}H_{2.9}O_5$ | 2.2 | 0.5 | GMR | 9 | 15 | X |
| 35 (comparison) | $SiH_4 + CO_2 + CH_4$ | 0.05 | −400 | $SiC_{10.5}H_{2.9}O_5$ | 1.6 | 2 | GMR | 31 | 21 | X |

Example 4

$Si(OC_2H_5)_4$ was introduced as a material gas for a compound containing Si, C, H and O, at a flow rate of 5 SCCM. RF of 500 W was applied as alternating current for generating plasma. Substantially the same procedures were repeated as in Example 1 to prepare the samples shown in Table 4, by selecting either 0.005 Torr or 0.05 Torr as the operating pressure and −800 V or −400 V as the self-bias applied on the running surface or sliding surface of the GMR thin-film head. The samples were evaluated and the results are shown in Table 4.

[Table 4]

TABLE 4

| Sample No. | Material gas | Operating pressure (Torr) | Bias voltage (V) | Composition | Refractive index | Film thickness (nm) | Thin-film head type | Sctatch hardness (relative value) | Breakdown voltage (V) | Corrosion resistance |
|---|---|---|---|---|---|---|---|---|---|---|
| 41 | $Si(OC_2H_5)_4$ | 0.005 | −800 | $SiC_{7.0}H_{4.5}O_3$ | 2.2 | 2 | GMR | 65 | 43 | ◯ |
| 42 | $Si(OC_2H_5)_4$ | 0.005 | −800 | $SiC_{7.0}H_{4.5}O_3$ | 2.2 | 3 | GMR | 75 | 53 | ◯ |
| 43 | $Si(OC_2H_5)_4$ | 0.005 | −800 | $SiC_{7.0}H_{4.5}O_3$ | 2.2 | 1 | GMR | 55 | 35 | ◯ |
| 44 (comparison) | $Si(OC_2H_5)_4$ | 0.005 | −800 | $SiC_{7.0}H_{4.5}O_3$ | 2.2 | 0.5 | GMR | 12 | 14 | X |
| 45 (comparison) | $Si(OC_2H_5)_4$ | 0.05 | −400 | $SiC_{7.0}H_{4.5}O_3$ | 1.6 | 2 | GMR | 33 | 22 | X |

Example 5

Si(OC$_2$H$_5$)$_4$ and C$_2$H$_4$ were introduced as material gases for compounds containing Si, C, H and O, at the flow rates of 5 SCCM and 5 SCCM, respectively. RF of 500 W was applied as alternating current for generating plasma. Substantially the same procedures were repeated as in Example 1 to prepare the samples shown in Table 5, by selecting either 0.005 Torr or 0.05 Torr as the operating pressure and −800 V or −400 V as the self-bias applied on the running surface or sliding surface of the GMR thin-film head. The samples were evaluated and the results are shown in Table 5.

[Table 5]

TABLE 5

| Sample No. | Material gas | Operating pressure (Torr) | Bias voltage (V) | Composition | Refractive index | Film thickness (nm) | Thin-film head type | Scratch hardness (relative value) | Breakdown voltage (V) | Corrosion resistance |
|---|---|---|---|---|---|---|---|---|---|---|
| 51 | Si(OC$_2$H$_5$)$_4$ + C$_2$H$_4$ | 0.005 | −800 | SiC$_{5.7}$H$_{1.7}$O$_2$ | 2.2 | 2 | GMR | 67 | 44 | ○ |
| 52 | Si(OC$_2$H$_5$)$_4$ + C$_2$H$_4$ | 0.005 | −800 | SiC$_{5.7}$H$_{1.7}$O$_2$ | 2.2 | 3 | GMR | 77 | 54 | ○ |
| 53 | Si(OC$_2$H$_5$)$_4$ + C$_2$H$_4$ | 0.005 | −800 | SiC$_{5.7}$H$_{1.7}$O$_2$ | 2.2 | 1 | GMR | 56 | 36 | ○ |
| 54 (comparison) | Si(OC$_2$H$_5$)$_4$ + C$_2$H$_4$ | 0.005 | −800 | SiC$_{5.7}$H$_{1.7}$O$_2$ | 2.2 | 0.5 | GMR | 13 | 5 | X |
| 55 (comparison) | Si(OC$_2$H$_5$)$_4$ + C$_2$H$_4$ | 0.05 | −400 | SiC$_{5.7}$H$_{1.7}$O$_2$ | 1.6 | 2 | GMR | 33 | 22 | X |

Example 6

Si(OCH$_3$)$_4$ was introduced as a material gas for compounds containing Si, C, H and O, at a flow rate of 5 SCCM. RF of 500 W was applied as alternating current for generating plasma. Substantially the same procedures were repeated as in Example 1 to prepare the samples shown in Table 6, by selecting either 0.005 Torr or 0.05 Torr as the operating pressure and −800 V or −400 V as the self-bias applied on the running surface or sliding surface of the GMR thin-film head. The samples were evaluated and the results are shown in Table 6.

[Table 6]

TABLE 6

| Sample No. | Material gas | Operating pressure (Torr) | Bias voltage (V) | Composition | Refractive index | Film thickness (nm) | Thin-film head type | Scratch hardness (relative value) | Breakdown voltage (V) | Corrosion resistance |
|---|---|---|---|---|---|---|---|---|---|---|
| 61 | Si(OCH$_3$)$_4$ | 0.005 | −800 | SiC$_{4.0}$H$_{2.1}$O$_2$ | 2.2 | 2 | GMR | 60 | 40 | ○ |
| 62 | Si(OCH$_3$)$_4$ | 0.005 | −800 | SiC$_{4.0}$H$_{2.1}$O$_2$ | 2.2 | 3 | GMR | 70 | 50 | ○ |
| 63 | Si(OCH$_3$)$_4$ | 0.005 | −800 | SiC$_{4.0}$H$_{2.1}$O$_2$ | 2.2 | 1 | GMR | 50 | 35 | ○ |
| 64 (comparison) | Si(OCH$_3$)$_4$ | 0.005 | −800 | SiC$_{4.0}$H$_{2.1}$O$_2$ | 2.2 | 0.5 | GMR | 12 | 15 | X |
| 65 (comparison) | Si(OCH$_3$)$_4$ | 0.05 | −400 | SiC$_{4.0}$H$_{2.1}$O$_2$ | 1.6 | 2 | GMR | 30 | 20 | X |

Example 7

Substantially the same procedures were repeated as in Example 1 (preparation of Samples 1-5), except that material gases containing Si, C, H, O and N were used, instead of gases containing only Si, C, H and O. Specifically, $Si(OCH_3)_4$, $NO_2$ and $CH_4$ were introduced at the flow rates of 5 SCCM, 5 SCCM and 3 CCM, respectively. The resultant samples were evaluated and the results are shown in Table 7.

[Table 7]

TABLE 7

| Sample No. | Material gas | Operating pressure (Torr) | Bias voltage (V) | Composition | Refractive index | Film thickness (nm) | Thin-film head type | Scratch hardness (relative value) | Breakdown voltage (V) | Corrosion resistance |
|---|---|---|---|---|---|---|---|---|---|---|
| 71 | $Si(OCH_3)_4 +NO_2+CH_4$ | 0.005 | −400 | $SiC_{7.5}H_{2.0}O_4N_2$ | 2.2 | 2 | GMR | 65 | 45 | ○ |
| 72 | $Si(OCH_3)_4 +NO_2+CH_4$ | 0.005 | −400 | $SiC_{7.5}H_{2.0}O_4N_2$ | 2.2 | 3 | GMR | 75 | 55 | ○ |
| 73 | $Si(OCH_3)_4 +NO_2+CH_4$ | 0.005 | −400 | $SiC_{7.5}H_{2.0}O_4N_2$ | 2.2 | 1 | GMR | 55 | 40 | ○ |
| 74 (comparison) | $Si(OCH_3)_4 +NO_2+CH_4$ | 0.005 | −400 | $SiC_{7.5}H_{2.0}O_4N_2$ | 2.2 | 0.5 | GMR | 15 | 10 | X |
| 75 (comparison) | $Si(OCH_3)_4 +NO_2+CH_4$ | 0.05 | −400 | $SiC_{7.5}H_{2.0}O_4N_2$ | 1.6 | 2 | GMR | 32 | 22 | X |

As is apparent from the results shown above, the thin-film head of the present invention has excellent scratch hardness, higher breakdown voltage and excellent corrosion resistance.

Accordingly, the thin-film head of the present invention can be used for large packing density and is suitable for such an application.

It should be noted that when the thickness of the protective film is above 3 nm, the film is not suitable for thin-film head for large packing density.

EFFECT OF THE INVENTION

According to the present invention, the thin-film head that has excellent coherence to alumina, permalloy, Sendust, iron nitride and the like and exhibits excellent durability is provided, as well as the method producing the same. Furthermore, it is possible to attain a method for producing the thinner film with less production steps and lower costs.

What I claim is:

1. A method for producing a thin-film head comprising vapor-depositing a protective film on at least the surface facing a recording medium under an operating pressure of less than 0.05 Torr while applying a negative bias voltage of lower than −400 V but higher than or ecіual to −1000 V to the thin-film head, said protective film having the composition represented by the formula:

$SiC_XH_YO_ZN_W$ where X=3-26, Y=0.5-13, Z=0.5-6 and W=0-6, in terms of atomic ratio, having a film thickness of 1-3 nm and having a refractive index of 2.0 or more.

2. The method according to claim 1, wherein said bias voltage is applied as self-bias generated by an applied DC voltage or an applied high frequency current.

3. The method according to claim 1, wherein said protective film is formed by a plasma CVD method.

4. The method according to claim 1, wherein said protective film is formed by an ionization deposition method.

5. The method according to claim 1, wherein said protective film is formed by a sputtering method.

6. The method according to claim 1, wherein said surface facing the recording medium comprises an oxide substrate, an oxide insulation layer, an interlayer thin film and a layer made of soft magnetic metal.

7. The method according to claim 1, wherein said head is selected from an MR head, a GMR head and a TMR type or CPP type head.

8. The method according to claim 1, wherein the operating pressure is about 0.001-0.008 Torr and the negative bias voltage is lower than or equal to −800 V but higher than or equal to −1000 V.

9. The method according to claim 8, wherein said protective film is formed by a plasma CVD method.

10. The method according to claim 8, wherein said protective film is formed by an ionization deposition method.

11. The method according to claim 8, wherein said protective film is formed by a sputtering method.

12. The method according to claim 8, wherein said surface facing the recording medium comprises an oxide substrate, an oxide insulation layer, an interlayer thin film and a layer made of soft magnetic metal.

13. The method according to claim 8, wherein said head is selected from an MR head, a GMR head and a TMR type or CPP type head.

* * * * *